United States Patent [19]

Balagopal et al.

[11] Patent Number: 5,580,430

[45] Date of Patent: Dec. 3, 1996

[54] SELECTIVE METAL CATION-CONDUCTING CERAMICS

[75] Inventors: Shekar H. Balagopal; John H. Gordon; Anil V. Virkar; Ashok V. Joshi, all of Salt Lake City, Utah

[73] Assignee: Ceramatec, Inc., Salt Lake City, Utah

[21] Appl. No.: 204,026

[22] Filed: Feb. 28, 1994

Related U.S. Application Data

[63] Continuation-in-part of Ser. No. 843,509, Feb. 28, 1992, Pat. No. 5,290,405.

[51] Int. Cl.$^6$ ................................................ C25B 13/04
[52] U.S. Cl. .......................... 204/252; 204/295; 501/103; 501/133; 501/152; 501/154; 428/428; 428/432; 428/697
[58] Field of Search .................................. 204/252, 421, 204/295; 505/809; 429/30, 33, 193; 501/133, 103, 152, 154; 428/432, 428, 697

[56] References Cited

U.S. PATENT DOCUMENTS

| | | | |
|---|---|---|---|
| 4,097,345 | 6/1978 | Shannon | 204/59 AM |
| 4,119,503 | 10/1978 | Spaziante et al. | 204/59 R |
| 4,248,715 | 1/1981 | Olivier | 204/260 |
| 4,990,413 | 2/1991 | Lee et al. | 429/191 |
| 5,139,987 | 8/1992 | Wedlake | 429/86 |

FOREIGN PATENT DOCUMENTS 5934792  5/1979  Japan.

OTHER PUBLICATIONS

Shannon, R. D., et al. "Ionic Conductivity in $Na_5YSi_4O_{12}$–Type Silicates", 1978 No month available.
Jorissen, J., et al. "The behaviour of ion exchange membranes in electrolysis and electrodialysis of sodium sulphate", Journal of Applied Electrochemistry, Mar. 14, 1991, pp. 869–876.
Kudo, T., et al. "Solid State Ionics", pp. 107–108, Nasicon and related Oxoacid salts. No month available 1990.
Production of Acid and Caustic From Salt (Ion Substitution), [press release], Ionics Incorporated. No date available.
Wett, Tedd, "The Edge in Electrolyzers", Chemical Business, Jul./Aug. 1989, pp. 41–44.
Winnick, Jack, "Electrochemical Membrane Gas Separation", Chemical Engineering Progress, Jan. 1990, pp. 41–46.
Aquatech Bipolar Membrane System (advertising materials), 1985 No month available.
Basta, Nicholas, "Use Electrodialytic Membranes for Waste Recovery", Chemical Engineering, Mar. 3, 1986.
"Bipolar membrane systems available for pilot leasing", Chemical Processing, Sep. 1986, p. 119.
Chowdhury, Jayadeve, "New chlor–alkali methods", Chemical Engineering, Apr. 30, 1985, pp. 22–27.
European Search Report form The Hague date Oct. 15, 1993.
Cui et al.; "High Energy Density Batteries and New Types of Solid State Electrolytes"; Oct.–1988; pp. 47–51.
Cui, et al., High Density Cells and New Types of Solid–State Electrolytes; Journal of Wuhan University of Technology, 1988, No. 3, pp. 47–51 (translation) No month available.

Primary Examiner—Kathryn Gorgos
Attorney, Agent, or Firm—Trask, Britt & Rossa

[57] ABSTRACT

Ceramic materials are disclosed which have comprehensive characteristics of high ion-conductivity for alkali metal cations at low temperatures, high selectivity for alkali metal ions, good current efficiency and stability in water and corrosive media under static and electrochemical conditions. Also disclosed is an electrochemical cell, the electrolyte of which employs the disclosed ceramic materials, for use in electrolysis of aqueous alkali salt solutions to form caustic.

22 Claims, 12 Drawing Sheets

MICROSTRUCTURE
LOW CONDUCTIVITY

Fig. 12B

MICROSTRUCTURE
HIGH CONDUCTIVITY

OVERALL REACTION

$$Na_2SO_4 + 3 H_2O \longrightarrow 2 NAOH + H_2SO_4 + H_2 + 1/2\ O_2$$

72 KWhrs PRODUCES $\begin{cases} 40\ Kg\ NaOH \\ 49\ Kg\ H_2SO_4 \\ 1\ Kg\ OR\ 11.2\ M^3\ H_2 \\ 8\ Kg\ OR\ 5.6\ M^3\ O_2 \end{cases}$

SELECTIVE METAL CATION-CONDUCTING CERAMICS

RELATED APPLICATIONS

This is a continuation-in-part of U.S. application Ser. No. 843,509, issued Feb. 28, 1992 now U.S. Pat. No. 5,290,405, issued Mar. 1, 1994 to the same assignee as herein, and is incorporated herein by reference.

BACKGROUND OF THE INVENTION

1. Field

This invention relates to ceramic materials which are useful in many applications, but especially to those which are particularly useful in electrolytic systems for simultaneous production of caustic and acids by electrolysis of an aqueous alkali metal (e.g., sodium) salt solution.

2. State of the Art

Electrolytic systems for use in producing caustic from salt solutions have been disclosed. In such systems, various materials have been suggested for use as an electrolytic membrane positioned between an anolyte chamber and a catholyte chamber for transportation of ions therethrough. Such materials include ceramic materials alone, polymeric materials, and combinations of ceramic and polymeric materials.

The known advantage of polymeric materials as electrolytes in the electrolysis of salt solutions is their high conductivity and increased resistance to acidic and caustic environments resulting from the electrolytic process. The known disadvantage of polymers, however, is their low selectivity for ionic species. That is, polymers transport protons as well as alkali ions, such as sodium ions, the result of which is an inefficient operation of the electrolytic cell.

The known advantage of ceramic materials is their excellent ion-conducting characteristics and good selectivity under certain conditions. Nasicon (sodium [Na] super ion conductor) materials, such as $Na_3Zr_2PSi_2O_{12}$, have a known advantage over beta alumina, another sodium ion-conductors in that Nasicon is comparatively stable in water while beta alumina is not. Further, Nasicon materials are comparable to beta alumina in superiority as sodium ion-conductors. The disadvantage of Nasicon-type materials is that some Nasicon-type materials are unstable in acidic and caustic environments due to some species of the Nasicon being particularly subject to attack by acids and the like. Further, ceramic materials have a lower ion conductivity at lower temperatures as compared to polymeric materials. Thus, the combination of polymeric and ceramic materials may provide a more suitable material for use in electrolysis of salt solutions.

Given the specific disadvantages of polymeric materials, however, and the additional labor and cost of producing ceramic/polymeric composite materials, it would be advantageous to provide a ceramic material having superior ion-conducting and selectivity characteristics, while being comparatively stable in water and acid/caustic environments.

SUMMARY OF THE INVENTION

In accordance with the present invention, ceramic materials are disclosed which have comprehensive characteristics of high ion-conductivity for alkali metal cations at low temperatures, high selectivity for alkali metal ions, good current efficiency and comparative stability in water and corrosive media under static and electrochemical conditions. Ceramic materials of particular suitability are metal super ion conducting materials, or "mesicon" materials, which display the required characteristics. Nasicon-type materials are but one example of mesicon materials. While the ceramic materials disclosed herein are suitable for many applications, including gas generation and sodium sensor systems, the ceramic materials are described herein in connection with electrolchemical cells which produce caustic from aqueous alkali salt solutions as an exemplar application.

The materials disclosed herein as being highly conductive and having high selectivity are those metal super ion conducting materials, i.e., mesicons, which are capable of transporting or conducting any alkali metal cation, such as sodium (Na), lithium (Li), potassium (K), or conducting silver (Ag) ions. Various composition formulas have been described for metal super ion-conductors. For example, there are mesicon formulations which include $Me_3Zr_2Si_2PO_{12}$, where Me=Na, Li, Ag or K; $Me_5GdSi_4O_{12}$ where Me=Ag, Li or Na; and $A_xTi_3P_6Si_2O_{25}$ where A=Li, Na and K, and $0 \leq X \leq 2$. Included in the family of mesicon materials are Nasicon-type materials having various formulas, including $Na_{1+x}Zr_xP_{3-x}Si_xO_{12}$ where $0 \leq x \leq 3$ and $Na_3M_2(PO_4)_3$ where M=Sc, Cr or Fe. There are also so-called "Lisicon" materials, such as $LiZr_2(PO_4)_3$ and $Li_3Zr_2Si_2PO_{12}$.

Virtually all mesicon-type materials comprise species of compounds which give structural uniqueness to the material, and thereby enhance certain properties of the material or give rise to the disadvantages of the material. For example, the Nasicon-type material $Na_5SmSi_4O_{12}$ may generally include a certain number of moles each of $Na_2O$, $Sm_2O_3$ and $SiO_2$, of which, for example, $Na_2O$ may be particularly subject to attack by $H_2SO_4$. Therefore, the mesicon-type materials of the present invention are selected to include the lowest concentration of species which are subject to corrosive materials while retaining structure which provides high conductivity.

While the ceramic materials disclosed herein encompass or include many formulations of mesicon materials, this disclosure concentrates on an examination of Nasicon-type materials for the sake of simplicity. The focussed discussion of Nasicon-type materials as one example of mesicon materials is not intended to limit the scope of the invention, however.

Thermodynamic analysis suggests that Nasicon-type materials without the presence of phosphorus may offer the best formulation for achieving increased stability in corrosive (i.e., acidic or caustic) environments. However, the particular species of compounds which comprise the Nasicon-type material must be carefully selected to obtain the optimum lowest concentration of reactive species. Nasicon-type materials having the general formula $Na_5RESi_4O_{12}$, where RE is Yttrium or any rare earth metal, are particularly suitable for electrolytic decomposition of sodium salts to produce caustic. However, other Nasicon-type and mesicon-type formulations which have the characteristics described herein are equally as suitable.

The stability in or resistance to corrosive media of the mesicon materials described herein may be enhanced by coating or treating the mesicon material with a very thin layer of glass material. The coating of glass, which preferably may be selected from the soda-lime-silicate variety, protects the underlying mesicon material from exposure to corrosive media, but does not significantly reduce conductivity.

Nasicon-type materials having the formula $Na_5RESi_4O_{12}$ contain rings formed by $SiO_4$ tetrahedra, twelve per ring, which are orthogonal to the c-axis. Sodium ions ($Na^+$) move through channels between the rings. Conductivity of the material is a function of the ion size of Y or the rare earth metal selected. The species of Nasicon-type materials having the formula $Na_5RESi_4O_{12}$ are, with slight exception for sodium silicates, not subject to attack by acids, such as sulfuric acid. Contrastingly, $Na_3PO_4$ is subject to attack by acids. Therefore, $Na_5RESi_4O_{12}$ materials are more resistant to corrosive environments than $Na_{1+x}Zr_xP_{3-x}Si_xO_{12}$ formulas.

In particular, Nasicon-type materials having the formula $Na_5RESi_4O_{12}$ have increased sodium ion conductivity and sodium ion selectivity compared to other sodium ion-conducting ceramics and polymers. The increased conductivity and selectivity of Nasicon-type materials of that formulation result from particular sintering procedures and temperatures which yield increased density of material. Further, the selected sintering techniques and temperature produce a single phase material which lessens or eliminates corrosion of the material since it appears that corrosion tends to occur at grain boundaries in the material.

The Nasicon-type materials disclosed herein are useful as sodium-ion conducting electrolytes in electrolytic cells having a corrosion resistant container, a catholyte chamber, an anolyte chamber, an anode and a cathode. A sodium salt, such as an aqueous solution of sodium sulfate, is charged into the anolyte chamber. A solution of caustic is charged into the catholyte chamber. The solution may be dilute or concentrated. It is desirable to start with an electrolyte solution of some sort in the catholyte chamber since pure water is not a very good electrolyte.

A general electrolytic reaction resulting from the use of the described electrolytic cell where M is a mono-valent cation and A is an anion with a charge of −x is as follows:

More specifically, an overall electrolytic reaction resulting from use of the described electrolytic cell constructed with a sodium ion conducting Nasicon-type material as the electrolyte and using sodium sulfate is as follows:

$$Na_2SO_4+3H_2O \rightarrow 2NaOH+H_2SO_4+\tfrac{1}{2}O_2+H_2 \qquad \text{Equation (1)}$$

The half-cell reactions may be summarized as follows:

$$\text{(anode) } Na_2SO_4+H_2O \rightarrow 2Na^+ + H_2SO_4 + 2e^- + \tfrac{1}{2}O_2\uparrow \qquad \text{Equation (2)}$$

$$\text{(cathode) } 2Na^+ + 2H_2O + 2e^- \rightarrow 2NaOH + H_2\uparrow \qquad \text{Equation (3)}$$

These reactions are electrolytic reactions, taking place under an induced current wherein electrons are introduced or are removed to cause the reactions. The reactions proceed only so long as a current is applied to the cell. Contrary to electrolytic reactions, galvanic reactions may occur when an applied potential to the cell is removed, which tends to reduce the efficiency of the electrolytic cell. It is preferred that only electrolytic reactions occur in the cell and that galvanic reactions be eliminated or, at least, greatly minimized. Nasicon-type materials, especially of the type described herein, have low (negligible) electronic conductivity, virtually eliminating any galvanic reactions from occurring when an applied potential or current is removed. Ceramic membranes of the present invention are those which have very mobile sodium, potassium, lithium or silver ions (high ionic conductivity), low electronic conductivity and comparatively high corrosion resistance.

The cation conductive ceramic materials disclosed herein for use in electrolytic cells can be used successfully in the formation of caustic from the electrolysis of aqueous sodium salt solutions, including such solutions as sodium carbonate, sodium nitrate, sodium phosphate, sodium hypochlorite, sodium chlorite, and sodium perchlorate, and sodium organic salts. The ceramic materials disclosed herein are equally applicable for use in weak acid environments as in strong acid environments. An open-tube electrolytic cell is also disclosed for use in forming caustic from metal salt solutions.

DETAILED DESCRIPTION OF THE INVENTION

The ceramic materials disclosed herein are particularly suitable for use in the electrolysis of aqueous alkali salt solutions because they have high ion-conductivity for alkali metal cations at low temperatures, high selectivity for alkali metal cations, good current efficiency and stability in water and corrosive media under static and electrochemical conditions. Comparatively, beta alumina is a ceramic material having high sodium ion conductivity, but is also known to be unstable in water and corrosive environments. Nasicon-type materials have equally high sodium ion conductivity in comparison to beta alumina, and have comparatively increased stability in water and corrosive environments.

Nasicon-type materials are described with varying formulas having varying types of atoms included therein. Examples of general formulas of Nasicon-type materials include $Na_{1+x}Zr_xP_{3-x}Si_xO_{12}$ where $0 \leq x \leq 3$ and $Na_3M_2(PO_4)_3$ where M=Sc, Cr or Fe. However, thermodynamic analyses suggest that Nasicon-type materials which do not contain phosphorus may exhibit greater stability in corrosive environments. This appears to be true because certain species, including $Na_3PO_4$ and sodium silicates are more easily attacked by acids, such as $H_2SO_4$. Therefore, those Nasicon-type materials which do not contain phosphorus, or which contain significantly reduced concentrations of phosphorous-inclusive species, are more suitable for use in electrolysis of aqueous sodium salt solutions.

A particularly suitable Nasicon-type material has the formula $Na_5RESi_4O_{12}$ where RE is Yttrium or any rare earth metal. Nasicon-type materials of that formulation are ringed structures formed by twelve $SiO_4$ tetrahedra. Sodium ions move through the channels formed between the rings. The ion conductivity through the material is a function of the ion size of the RE. Thus, for example, in $Na_5SmSi_4O_{12}$, $\sigma=0.1$ $(\Omega cm)^{-1}$ at 200° C.

It should be noted that conductivity is generally greater at higher temperatures (e.g., $\geq$200° C.). At lower temperatures (e.g., $\leq$200° C.), the grain boundary phases may contribute to net resistance and are expected to lower the chemical resistance of the Nasicon-type materials to corrosive media. Minimizing the grain boundary phases leads to increased corrosion resistance.

The $Na_5RESi_4O_{12}$ contains 2.5 moles of $Na_2O$ (35.72%), 0.5 moles of $RE_2O_3$ (7.14%), and 4 moles of $SiO_2$ (57.14%). The three binaries are $Na_2O$-$RE_2O_3$ and $Na_2O$-$SiO_2$ and $RE_2O_3$-$SiO_2$. No information is known on the $Na_2O$-$RE_2O_3$ phase diagrams. However, with respect to $Na_2O$-$SiO_2$, the compounds $2Na_2O$-$SiO_2$ ($Na_4O$-$SiO_4$), $Na_2O$-$SiO_2$ ($Na_2SiO_3$), and $Na_2O$-$2SiO_2$ ($Na_2Si_2O_5$) are known to exist. All of the sodium silicates are water soluble and are subject to attack by $H_2SO_4$. With respect to $RE_2O_3$-$SiO_2$, the compounds $RE_2O_3$-$SiO_2$ ($RE_2SiO_5$) and $RE_2O_3$-$2SiO_2$ ($RE_2Si_2O_7$) are known to exist where RE=Dy (dysprosium), Er (Erbium), Gd (Gadolinium), La (Lanthanum), Nd (Neodymium), Sm (Samarium) and Yb (Ytterbium), as well as for Y (Yttrium).

The free energies of reaction of $Na_3PO_4$ and $Na_2SiO_3$ with $H_2SO_4$ are as indicated below. The standard free energies at 25° C. of the following compounds are:

| Material | $\Delta G°$ (kcal/mole) |
|---|---|
| $Na_2SiO_3$ | −341.00 |
| $Na_3PO_4$ | −427.00 |
| $H_2SO_4$ (aq) | −178.00 |
| $H_2SiO_3$ | −260.00 |
| $H_3PO_4$ | −268.00 |
| $Na_2SO_4$ | −303.00 |

For the reaction $$2Na_3PO_4 + 3H_2SO_4 \rightarrow 3Na_2SO_4 + 2H_3PO_4, \quad (i)$$

the standard free energy change is

That is, reaction (i) is favored. For the reaction $$Na_2SiO_3 + H_2SO_4 \rightarrow Na_2SO_4 + H_2SiO_3, \quad (ii)$$

the standard free energy change is

Reaction (ii) will also occur.

With the foregoing in mind, it can be seen that Nasicon-type materials having the formula $Na_{1+x}Zr_xP_{3-x}Si_xO_{12}$ contain species which are less thermodynamically favorable because of the phosphorous content. However, even with Nasicon-type materials having the formula $Na_5RESi_4O_{12}$, it is essential to minimize the thermodynamic activity of $Na_2SiO_3$. Lower activities of sodium silicates can be achieved by making compositions that are slightly rich in rare earth silicates and slightly poor in sodium silicates (or oxide) while maintaining the structure. Thus, in the pseudoternary $Na_2O$-$RE_2O_3$-$SiO_2$, the objective is to make samples of compositions slightly away from the $Na_2O$ apex. The compositions described herein are selected with sufficiently low species activity of $Na_2SiO_3$ so that the materials are not subject to attack by $H_2SO_4$ or other corrosive media.

The $Na_5RESi_4O_{12}$ Nasicon-type materials present a rhombohedral structure (which can be indexed as a hexagonal). The possible choices for RE in these materials includes Yttrium and any rare earth metal. Of that choice of atoms, those which have larger ionic radii are more suitable as part of the Nasicon-type compound because an increase in ionic radii is consistent with larger channel size in $Na_5RESi_4O_{12}$ and, therefore, an increase in ionic conductivity. Correspondingly, the larger the ionic radii and the higher the ionic conductivity, the more conductive is the material at lower temperatures.

The ionic radii of the larger ionic rare earth metals are $r_Y=0.893Å$, $r_{Dy}=0.908Å$, $r_{Gd}=0.938Å$, $r_{Sm}=0.964Å$, $r_{Nd}=0.995Å$, and $r_{La}=1.016Å$. Lutetium appears to be less suitable due to its smaller radius, namely $r_{Lu}=0.85Å$.

Nonstoichiometry may be described as deviation from stoichiometry along the $Na_5RESi_4O_{12}$-$RE_2O_3.2SiO_2$ joinder. Samples were made with the following compositions with δ as the measure of deviation from stoichiometry.

or $Na_{(5-5\delta)}RE_{(1+\delta)}Si_{(4-2\delta)}O_{(12-5\delta)}$

The above assumes a pseudobinary between $Na_5RESi_4O_{12}$ and $RE_2O_3 \cdot 2SiO_2$. Thus, if a compound or a phase is made in such a way that δ is a maximum possible, the thermodynamic activity of $Na_5RESi_4O_{12}$ will be the least possible in the conducting phase where the generic formula may still be referred to as "$Na_5RESi_4O_{12}$". As δ increases within the stability of the "$Na_5RESi_4O_{12}$" phase, the activity of $Na_2O$ decreases and thermodynamic stability in acidic media increases.

A process for manufacturing a-Nasicon-type material having the prescribed characteristics is as follows:

1. Component $Na_2CO_3$, $SiO_2$, and $RE_2O_3$ precursors are mixed in desired proportions. As noted, the objective is to make compositions with several nonzero values of δ.
2. Powder mixtures are calcined at 900° C. for 12 hours.
3. The calcined powders are milled in an attritor mill for 6 hours.
4. Disks and pellets are green-formed by die-pressing, followed by isostatic pressing.
5. Disks and pellets are sintered over a range of temperatures between 925° C. and 1150° C. for up to 8 hours.
6. Sintered disks and pellets are annealed (selected samples) over a range of temperatures between 875° C. and 1130° C. for up to 6 hours.

Example I describes a specific process for formulating $Na_5NdSi_4O_{12}$.

Example I

Components $Na_2CO_3$, $Nd_2O_3$, and $SiO_2$ were used as the precursors. Powder mixtures containing $Na_2CO_3$, $Nd_2O_3$, and $SiO_2$ were made in a molar proportion of 5 moles of $Na_2CO_3$, 1 mole of $Nd_2O_3$, and 4 moles of $SiO_2$. The powder mixture was ball-milled in methanol for 24 hours. The slurry was dried at 60° C. for 12 hours, passed through 18 mesh screen, and calcined at 900° C. for 12 hours. The calcined powder was characterized with regards to weight loss (gravimetry), phase(s) present (X-ray diffraction), and particle size and surface area (BET). The calcined powder was attritor-milled to reduce the particle size and render the powder sinterable. Powder was again characterized with respect to surface area and particle size distribution. Green pellets were uniaxially pressed at 20 ksi and isostatically pressed at 25 ksi. The pellets were fired at 1000° C. for 4 hours. The sintered samples were blue in color. The bulk density of the samples was determined to be 3.00 gm/ml. The samples were impervious indicating that they had sintered to the stage of closed porosity. The melting temperature of the samples was determined to be ~1050° C.

Samples of various compositions were fabricated substituting Y, Dy, Gd, Sm, Nd, and La for RE. It has been reported that the $Na_5RESi_4O_{12}$ rhombohedral structure is unstable for ionic radii which are too large. Specifically, it has been reported that the rhombohedral structure is unstable with Nd and La. X-ray diffraction (XRD) work demonstrates this to be the case in that the XRD patterns of $Na_5NdSi_4O_{12}$ and $Na_5LaSi_4O_{12}$ are different from those with other RE ions and are also different from each other. Both samples, however, densified during sintering and yielded dense pellets which could be further characterized with respect to electrical conductivity and electrochemical characterization.

Figure 1:
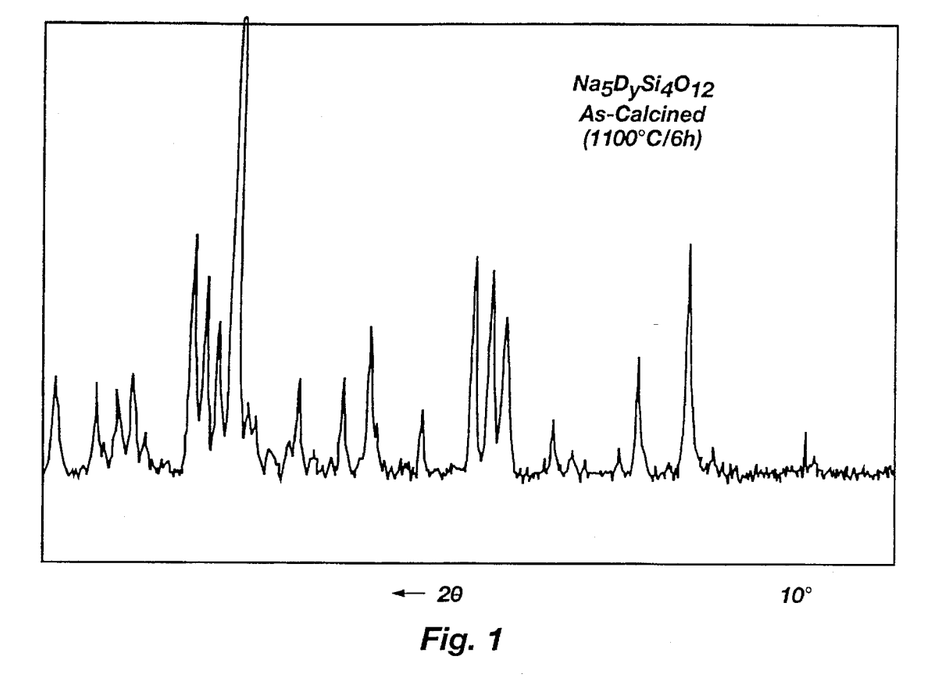
FIG. 1 is an x-ray diffraction pattern of $Na_5DySi_4O_{12}$.
Figure 2:
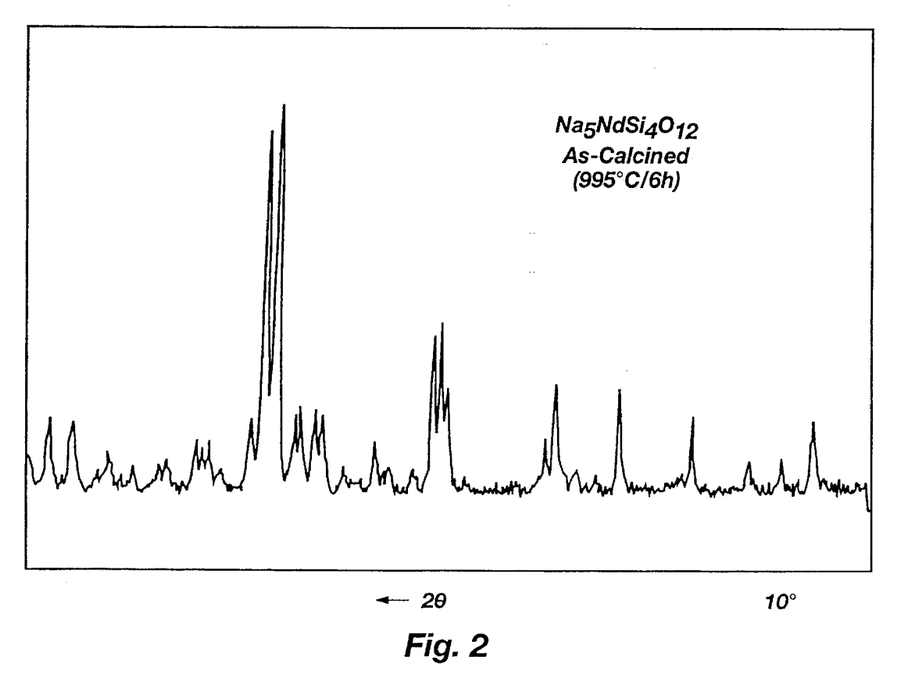
FIG. 2 is an x-ray diffraction pattern of $Na_5NdSi_4O_{12}$.

The X-ray diffraction (XRD) traces of $Na_5DySi_4O_{12}$ and $Na_5NdSi_4O_{12}$ are different from each other as shown by FIGS. 1 and 2, respectively. The XRD trace of $Na_5DySi_4O_{12}$ is the same as that reported for many other $Na_5RESi_4O_{12}$ and is of the Nasicon-type. However, that of $Na_5NdSi_4O_{12}$ is different. As will be discussed later, ionic conduction characteristics of $Na_5NdSi_4O_{12}$ are excellent for application, both at low and high temperatures. The $Na_5NdSi_4O_{12}$ has a different, at present unknown, structure. The $Na_5LaSi_4O_{12}$ has yet another structure. Notably, $Na_5NdSi_4O_{12}$ is conductive while $Na_5LaSi_4O_{12}$ appears to be an insulator. The conductivity of $Na_5NdSi_4O_{12}$ at 70° C. was measured to be ~$2.8 \times 10^{-3}$ $(\Omega cm)^{-1}$ while that of $Na_5LaSi_4O_{12}$ was ~$2.4 \times 10^{-6}$ $(\Omega cm)^{-1}$. The $Na_5YSi_4O_{12}$, $Na_5DySi_4O_{12}$, $Na_5GdSi_4O_{12}$, and $Na_5SmSi_4O_{12}$ all have a structure similar to each other.

ELECTROCHEMICAL TESTING

Various $Na_5RESi_4O_{12}$ electrolyte materials have been evaluated in electrochemical cells for the decomposition of $Na_2SO_4$, $NaClO_3$, and $NaNO_3$, particularly $Na_5DySi_4O_{12}$, $Na_5SmSi_4O_{12}$, and $Na_5NdSi_4O_{12}$ as the electrolyte materials. Testing was also done with NaOH solution in water for the purpose of determining the conductivity without the complication of corrosion effects.

Figure 3:
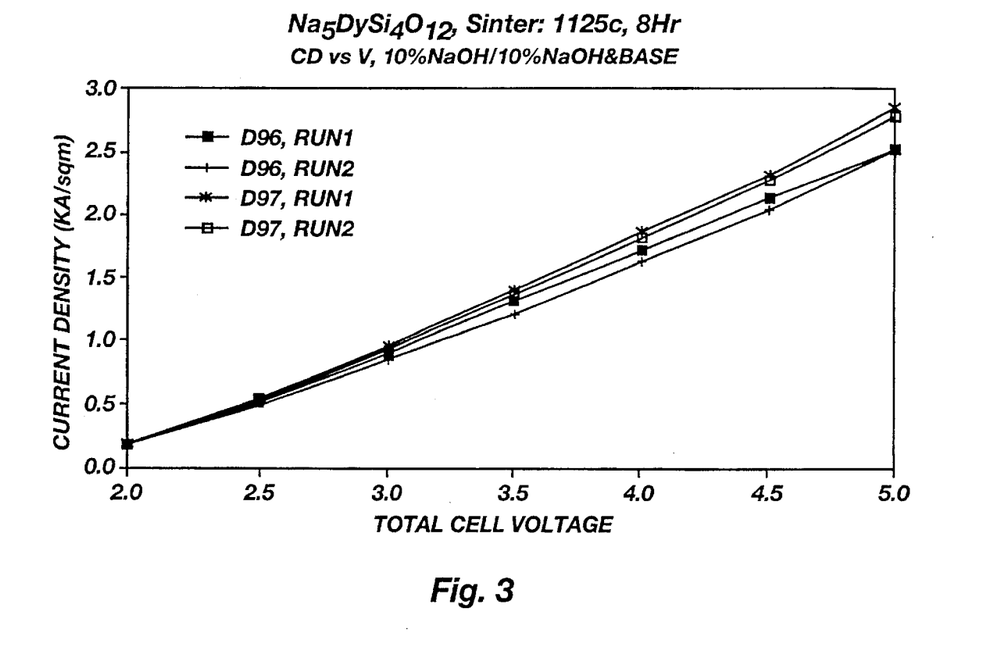
FIG. 3 is a graph illustrating the conductivity of $Na_5DySi_4O_{12}$ upon exposure to 10% solution of NaOH.
Figure 4A:
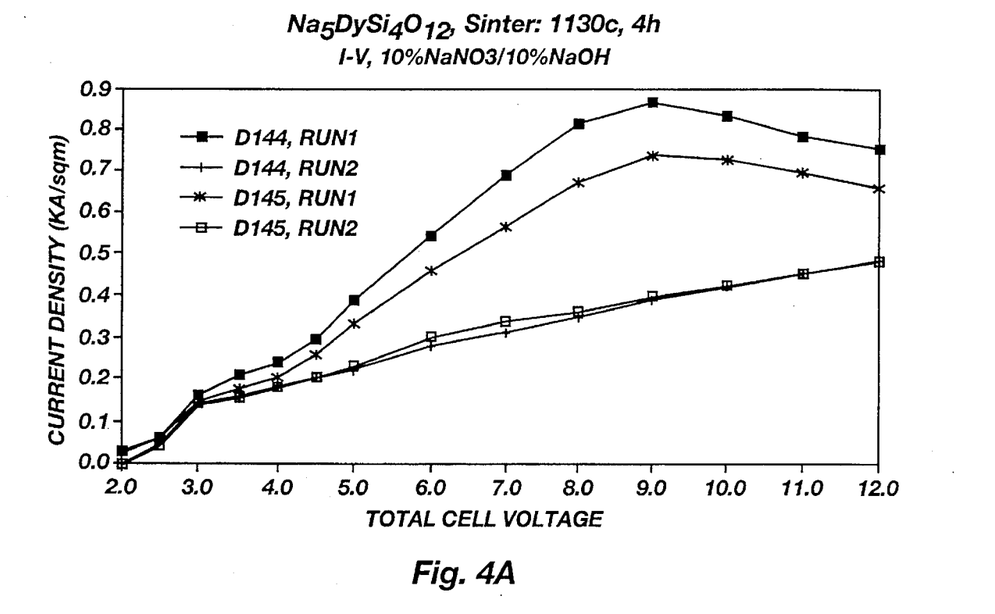
FIG. 4a is a graph illustrating current density versus voltage in nitrate electrolysis using an electrolyte having the formula $Na_5DySi_4O_{12}$.
Figure 4B:
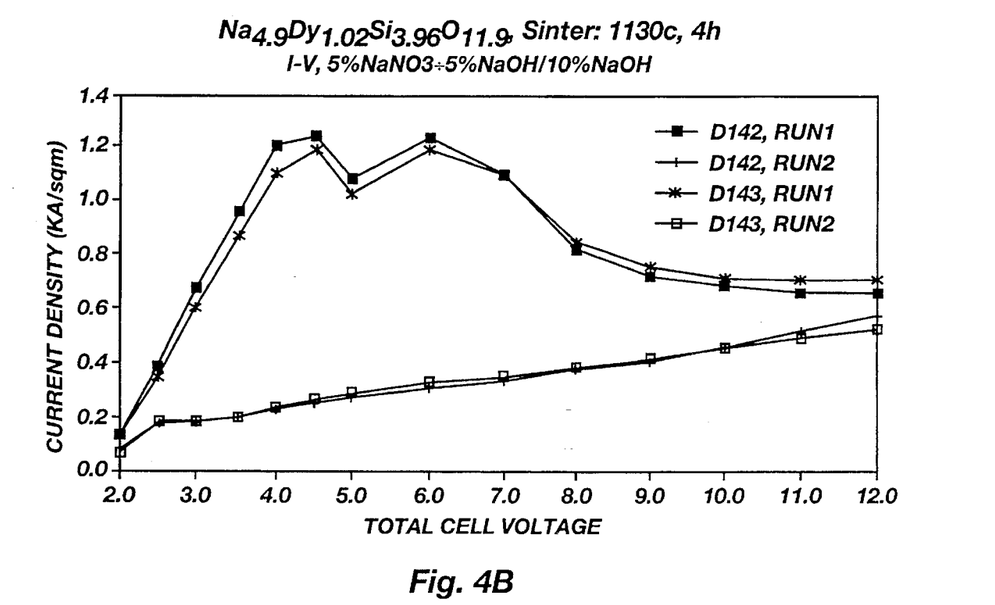
FIG. 4b is a graph illustrating current density versus voltage in nitrate electrolysis using an electrolyte having the non-stoichiometric formula $Na_{(5-5\delta)}Dy_{(1+\delta)}Si_{(4-2\delta)}O_{(12-5\delta)}$ where $\delta=0.02$.
Figure 5A:
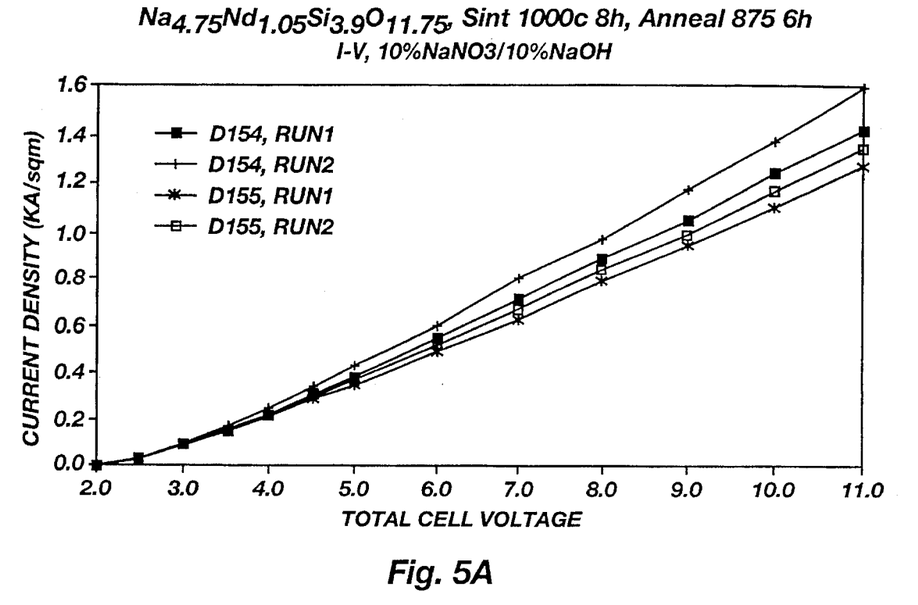
FIG. 5a is a graph illustrating current density versus voltage in nitrate electrolysis using an electrolyte having the formula $Na_{(5-5\delta)}Nd_{(1+\delta)}Si_{(4-2\delta)}O_{(12-5\delta)}$ where $\delta=0.05$.
Figure 5B:
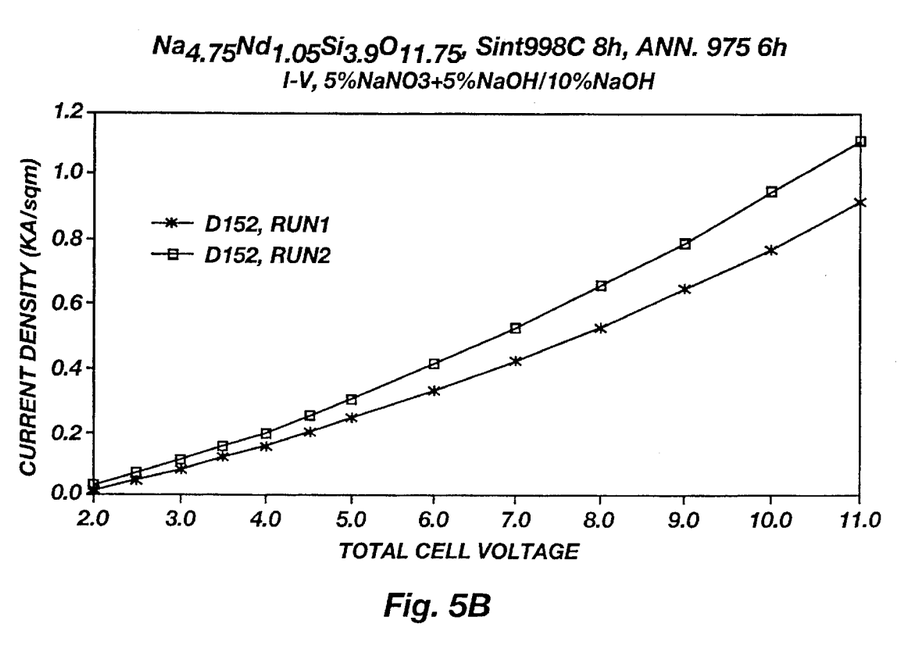
FIG. 5b is a graph illustrating current density versus voltage in nitrate electrolysis using an electrolyte having the non-stoichiometric formula $Na_{(5-5\delta)}Nd_{(1+\delta)}Si_{(4-2\delta)}O_{(12-5\delta)}$ where $\delta=0.05$.
Figure 6A:
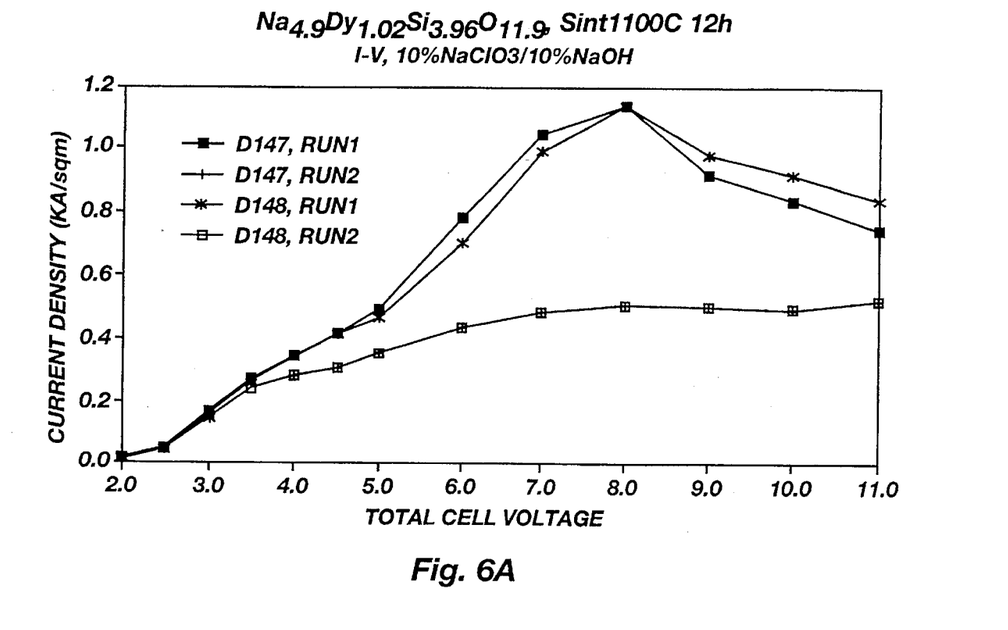
FIG. 6a is a graph illustrating current density versus voltage in chlorate electrolysis using $Na_{(5-5\delta)}Dy_{(1+\delta)}Si_{(4-2\delta)}O_{(12-5\delta)}$ where $\delta=0.02$.
Figure 6B:
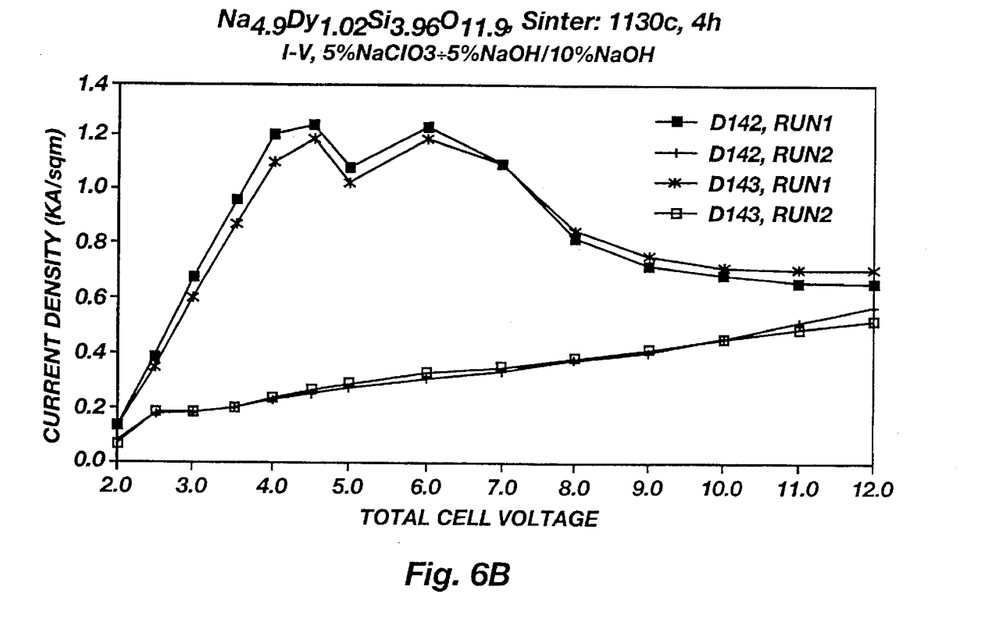
FIG. 6b is a graph illustrating current density versus voltage in chlorate electrolysis using $Na_{(5-5\delta)}Dy_{(1+\delta)}Si_{(4-2\delta)}O_{(12-5\delta)}$ where $\delta=0.02$ under different conditions.
Figure 7A:
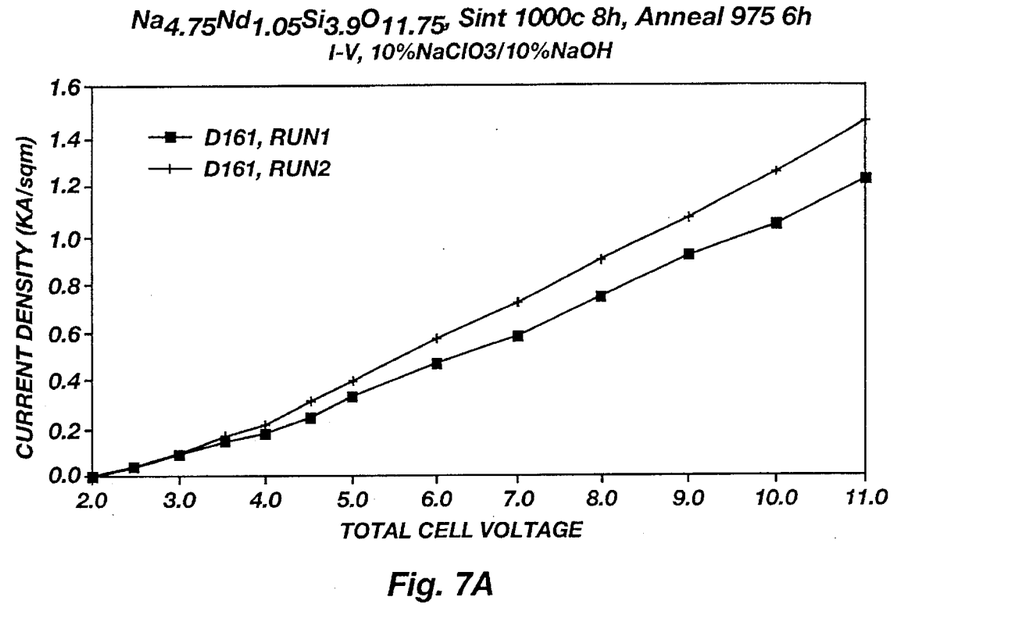
FIG. 7a is a graph illustrating current density versus voltage in chlorate electrolysis using $Na_{(5-5\delta)}Nd_{(1+\delta)}Si_{(4-2\delta)}O_{(12-5\delta)}$ where $\delta=0.05$.
Figure 7B:
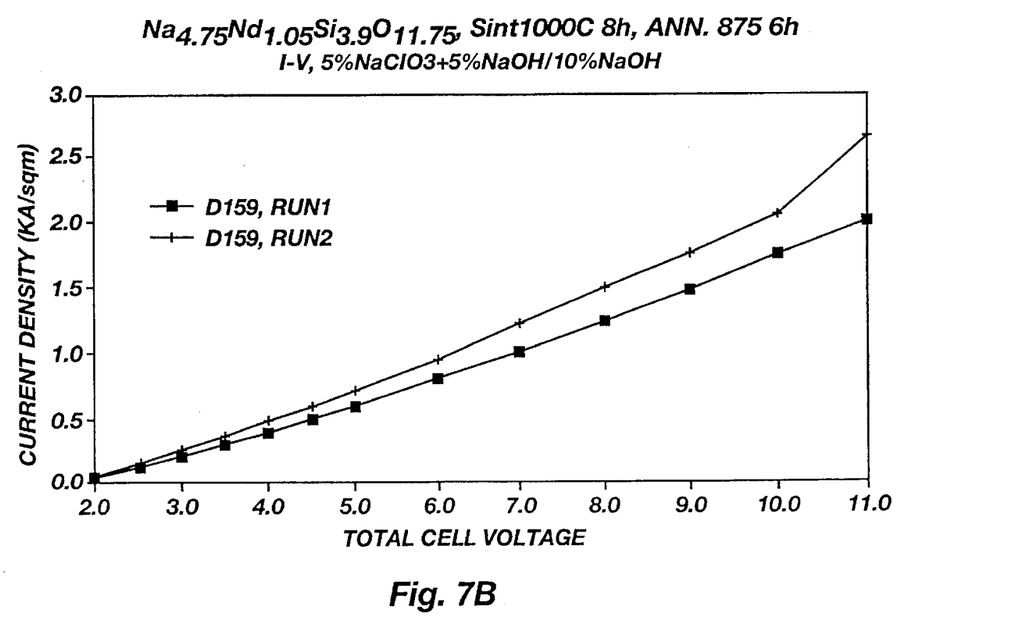
FIG. 7b is a graph illustrating current density versus voltage in chlorate electrolysis using $Na_{(5-5\delta)}Nd_{(1+\delta)}Si_{(4-2\delta)}O_{(12-5\delta)}$ where $\delta=0.05$.
Figure 8:
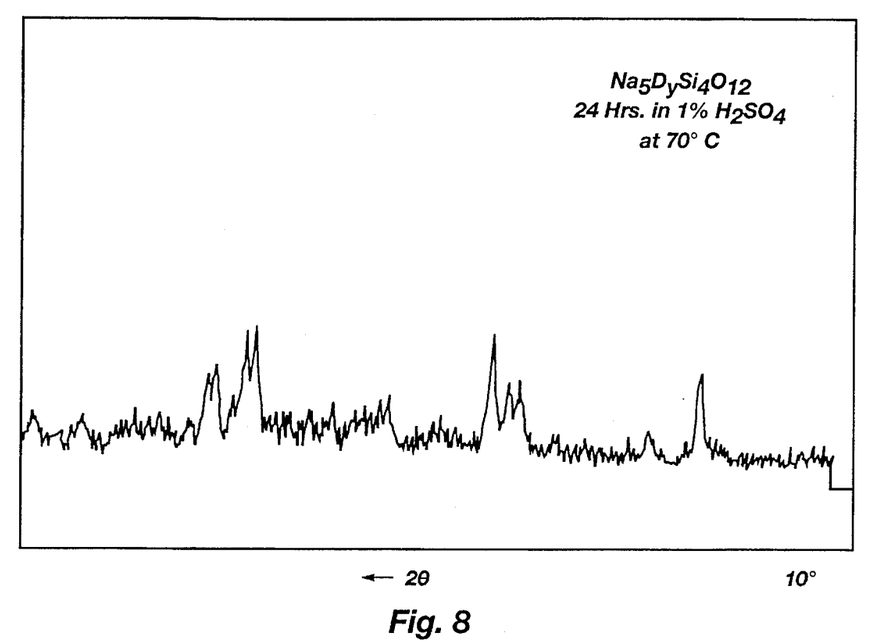
FIG. 8 is an x-ray diffraction pattern of $Na_5DySi_4O_{12}$ after exposure to a 1% solution of sulfuric acid.
Figure 9:
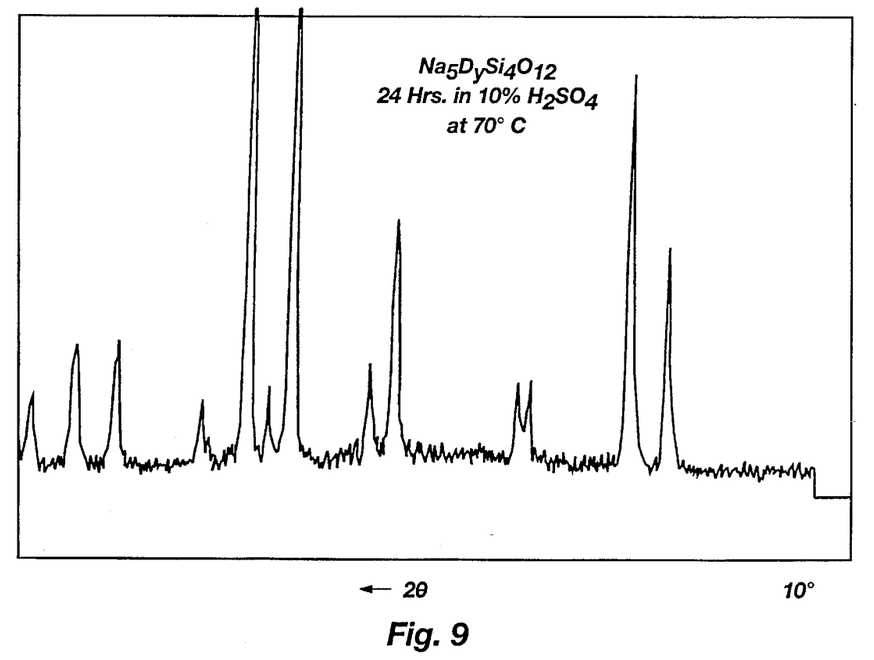
FIG. 9 is an x-ray diffraction pattern of $Na_5DySi_4O_{12}$ after exposure to a 10% solution of sulfuric acid.
Figure 10:
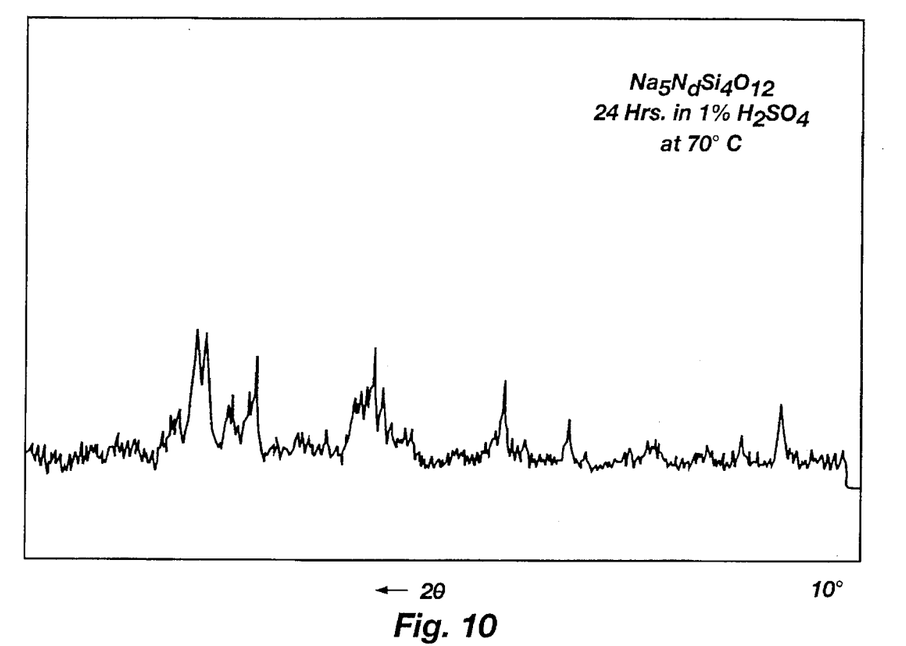
FIG. 10 is an x-ray diffraction pattern of $Na_5NdSi_4O_{12}$ after exposure to a 1% solution of sulfuric acid.
Figure 11:
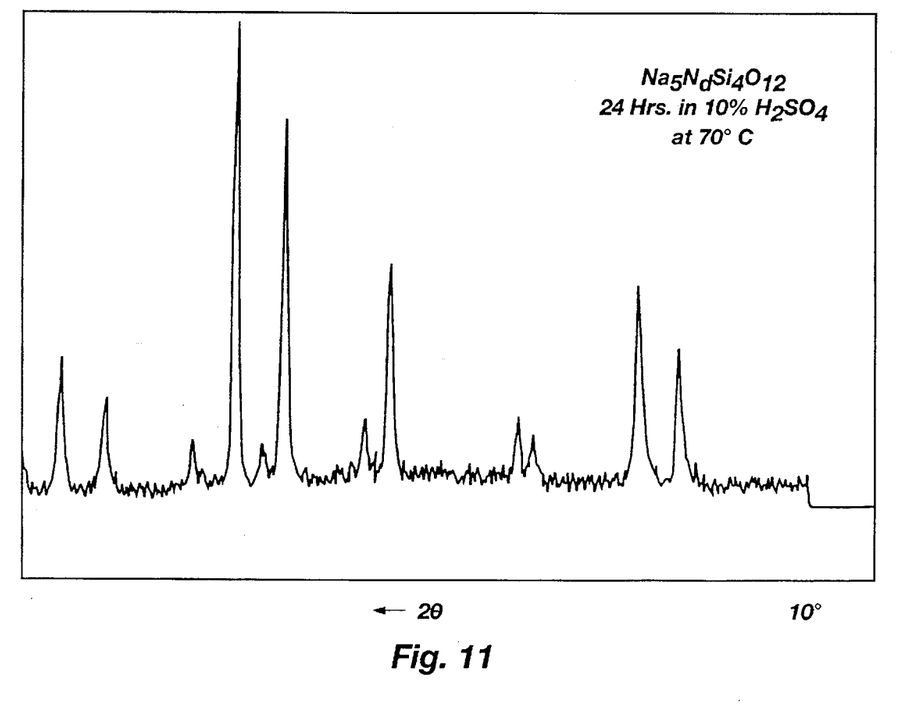
FIG. 11 is an x-ray diffraction pattern of $Na_5NdSi_4O_{12}$ after exposure to a 10% solution of sulfuric acid.

The $Na_5RESi_4O_{12}$ electrolytes were found to be electrochemically stable in sodium hydroxide solution. Taking advantage of this characteristic to determine the sodium ion conductivity of these materials with the absence of any corrosion effects, current was measured as a function of voltage when both anolyte and catholyte were 10% NaOH solutions. FIG. 3 shows experimental results for $Na_5DySi_4O_{12}$ which was sintered at 1125° C. for 8 hours. The experiment was conducted at 70° C. From the slope of the curve in FIG. 3, the conductivity of the material was caluclated to be 0.011 $(ohm-cm)^{-1}$. Conductivity of that magnitude is extraordinarily high for a solid material at relatively low temperature.

The maximum current density at 5 volts was observed with $Na_5DySi_4O_{12}$ material and was about 3.5 kA/m2, which is about half that of Nafion®, a polymer useful as an electrolyte. Nafion® has the following chemical structure where "n" denotes a possibility of more than one $CF_2CF_2$ sequence, and where "m" indicates a longer polymer chain. The $Na_5RESi_4O_{12}$ materials typically exhibited 95 to 100% current efficiency due to excellent selectivity. By contrast, Nafion® shows substantially lower (~60%) current efficiency. Table 1 gives a summary of conductivity, electrochemical testing and comparison with Nafion®. It can be seen that although phosphate containing Nasicon-type material is a suitable electrolyte, the Nasicon-type materials containing no phosphate have substantially higher conductivity when properly optimized through processing as described further hereinafter. In addition, they generally have higher selectivity toward sodium ions over protons and, thus, current efficiency is higher.

TABLE 1

| Material | Sintering Temperature (C.) | Anolyte/Catholyte | Conductivity @70C (ohm-cm)$^{-1}$ | id* (kA/sqm) | Current Efficiency |
|---|---|---|---|---|---|
| Nafion 324 | | 10%NaOH/10%NaOH | 4.7e-01 | 7.48 | |
| $Na_3Zr_2PSi_2O_{12}$ | | 10%$Na_2SO_4$ + $H_2SO_4$/10%NaOH | | 0.09 | 85% |
| $Na_5DySi_4O_{12}$ | 1125 | 10%NaOH/10%NaOH | 1.1e-02 | 3.5 | |
| $Na_5DySi_4O_{12}$ | 1075 | 10%$Na_2SO_4$ + $H_2SO_4$/10%NaOH | 7.9e-03 | 2.5 | 95-96% |
| $Na_{4.9}Dy_{1.02}Si_{3.96}O_{11.9}$ | 1125 | 10%$Na_2SO_4$ + $H_2SO_4$/10%NaOH | 5.6e-3 | 1.8 | |
| $Na_5SmSi_4O_{12}$ | 1030 | 10%NaOH/10%NaOH | 3.2e-03 | 1.0 | 100% |
| $Na_5NdSi_4O_{12}$ | 998 | 10%NaOH/10%NaOH | 2.8e-03 | 0.9 | 100% |
| $Na_{4.75}Nd_{1.05}Si_{3.9}O_{11.75}$ | 1000 | 10%NaOH/10%NaOH | 2.6e-03 | 0.83 | 100% | id* = Current density assuming 5.0 V total, .5 mm membrane, zero gap, .85 V anode overpotential, .5 V cathode overpotential, 2.06 V decomposition voltage FIGS. 4–7 show current density vs. voltage for nitrate and chlorate splitting with $Na_5DySi_4O_{12}$ and $Na_5NdSi_4O_{12}$ electrolytes. Current densities 1.6 kA/m2 were noted with negligible corrosion. All of the $Na_5RESi_4O_{12}$ materials exhibited corrosion in $H_2SO_4$.

CORROSION IN $H_2SO_4$

Experiments were conducted to determine the stability of the $Na_5RESi_4O_{12}$ phase in sulfuric acid. Samples of $Na_5RESi_4O_{12}$ material were subjected to varying concentrations of sulfuric acid, namely 0.1%, 1.0% and 10%, at a temperature of 70° C. for 24 hours. The suggested reaction is illustrated in the following equation:

$$2Na_5RESi_4O_{12} + 5H_2SO_4 \rightarrow 5Na_2SO_4 + RE_2O_3 \cdot 2SiO_2 + 6SiO_2 + 5H_2O$$

The calculated free energy of the reaction is:

$$\Delta G° = -2{,}067 + \Delta G°_{RE2O3,2SiO2} - 2\Delta G°_{Na5RESi4O12} \quad (I)$$

Now, $2\Delta G°_{Na5RESi4O12} = 5\Delta G°_{Na2O} + 6\Delta G°_{SiO2} + \Delta G°_{Re2O3.2SiO2} + \Delta°$. Thus, (I) becomes:

$$\Delta G° = -2{,}067 = 5\Delta G°_{Na2O} - 6\Delta G°_{SiO2} - \Delta°$$

or

$$\Delta G° = -465 - \Delta° = -465 + |\Delta°| \text{ Kcal/mol}.$$

If $\Delta G° < 0$, then the reaction may occur spontaneously.

It was observed that the $Na_5RESi_4O_{12}$ material reacts with $H_2SO_4$ when the ceramic material is in a powder form. X-ray diffraction patterns illustrating the effect of sulfuric acid treatment of $Na_5DySi_4O_{12}$ and $Na_5NdSi_4O_{12}$, respectively, in acid concentrations of 1% and 10% are shown in FIGS. 8–11. Thus, $|\Delta°| < 465$ Kcal/mol. However, the rate of corrosion on dense samples is expected to be much slower than that on powder. Further, reaction of $Na_5RESi_4O_{12}$ with $H_2SO_4$ does not appear to form $RE_2O_3 \cdot 2SiO_2$ or $RE_2O_3 \cdot SiO_2$. Thus, the material which remains after treatment with sulfuric acid contains some sodium, and $Na_5RESi_4O_{12}$ materials do not totally disintegrate.

The corrosion resistance of the $Na_5RESi_4O_{12}$ for the intended application can be further enhanced by depositing a thin layer of a glass which is known to be resistant to attack by $H_2SO_4$. A layer of glass may be positioned on the $Na_5RESi_4O_{12}$ electrolyte as depicted below. A number of different types of glass material are suitable for use, and particularly those which include sodium in their compositions. Soda-lime-silicate glasses are particularly suitable.

The deposition of a glass coating may be achieved by a number of methods, including dip-coating, slurry coating, sputtering, MOCVD (metal organic chemical vapor deposition), and sol-gel. Of these, the latter two methods are particularly suitable because a very thin deposition layer (about 1000Å) of glass is possible with those methods.

The specific resistance of the composite may be shown as $r = \rho_{electrolyte} d + \rho_{glass} \delta$, where d=thickness of the electrolyte $Na_5RESi_4O_{12}$, δ=thickness of glass, $\rho_{electrolyte}$=resistivity of $Na_5RESi_4O_{12}$, and $\rho_{glass}$=resistivity of the glass. The anticipated thickness of the glass coating on the electrolyte is δ≈1,000Å. The unit of specific resistance is (Ωcm²).

Deposition of the glass coating by the sol-gel method was conducted as follows:

Example II

A sodium conducting glass was prepared to have the following end composition: 46% $Na_2OH$, 43% $SiO_2$, and the balance $ZrO_2$. A dry environment for all handling of precursor materials was required. Tetraethyl orthosilicate ($Si(OC_2H_5)_4$), sodium ethoxide ($C_2H_5ONa$), and zirconium (IV) ethoxide ($Zr(OC_2H_5)_4$) were mixed in the proper stoiciometric ratios with 50% dried ethanol. Disks of Nasicon-type material, having a thickness of 0.5 mm, were thoroughly cleaned and dried, and were then dipped into the metal alkoxide mixture and were slowly removed. Subsequently, the disks were exposed to room humidity (40% RH) for 24 hours. The disks were then heated to 100° C. for 1 hour, then heated to 400° C. for 1 additional hour to complete the drying.

Glass compositions which appear to be particularly suitable for use as coatings on ceramic electrolytes include $Na_2O(46.0\%)$, $SiO_2(43.0\%)$, $ZrO_2(11.0\%)$, $Na_2O(42.0\%)$, $SiO_2(45.0\%)$, $ZrO_2(5.0\%)$, $Al_2O_3(8.0\%)$, $Na_2O(37.5\%)$, $SiO_2(50.0\%)$, $ZrO_2(12.5\%)$; and $Na_2O(45.0\%)$, $SiO_2(50.0\%)$, $B_2O_3(5.0\%)$.

IMPROVING CONDUCTIVITY AT LOW TEMPERATURES (≈70° C.):

Improved conductivity at low temperatures (about 70° C.) minimizes the power requirements of the electrolytic cell. Also, most of the corrosion is expected to occur by dissolution of grain boundary phases. It is thus desirable to ensure that grain boundaries are clean. It appears, based on sintering studies, that some incongruence in melting occurs at the boundary phases of $Na_5RESi_4O_{12}$ materials, as shown schematically in FIG. 12a. In order to remove the grain boundary phases, it is desirable to anneal sintered materials at lower temperatures (about 800° C. to 900° C.) so that single phase materials are formed.

Highest possible conductivity is achieved, therefore, by improving the density of the material through selection of certain powder characteristics, by controlling sintering conditions, and by assuring single phase compositions through annealing procedures. The improved conductivity of the Nasicon-type materials was brought about by an optimization of the material, by the following steps:

1) The particle size of calcined materials was thoroughly reduced to insure dense packing of powders prior to sintering.

2) The melting range of the materials was determined experimentally to determine the upper limit for sintering and annealing.

Figure 12A:
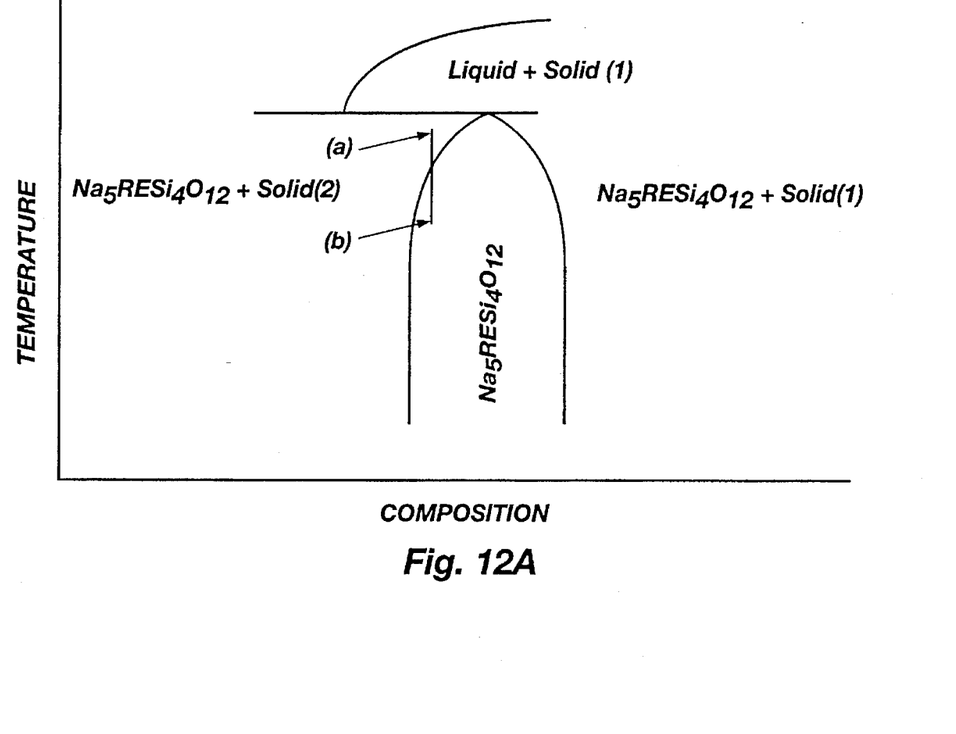
FIG. 12a is a schematic representation of the phase diagram of $Na_5RESi_4O_{12}$ materials illustrating incongruent melting.
Figure 12B:
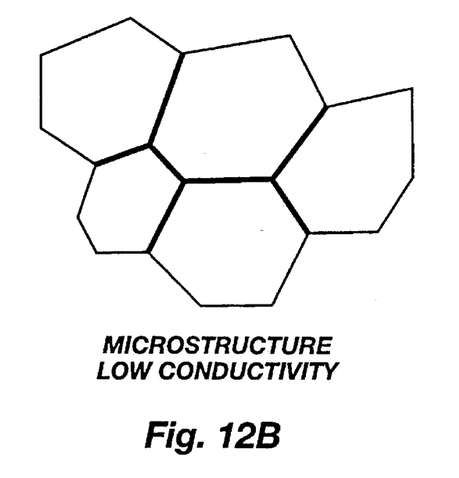
FIG. 12b is a schematic representation of an undesirable grain boundary phase microstructure.
Figure 12C:
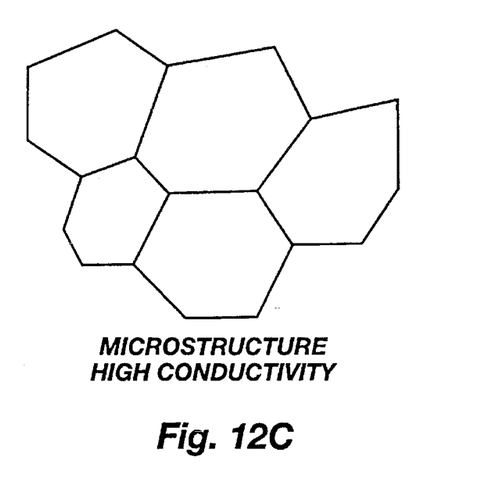
FIG. 12c is a schematic representation of a desirable grain boundary phase microstructure.
Figure 13:
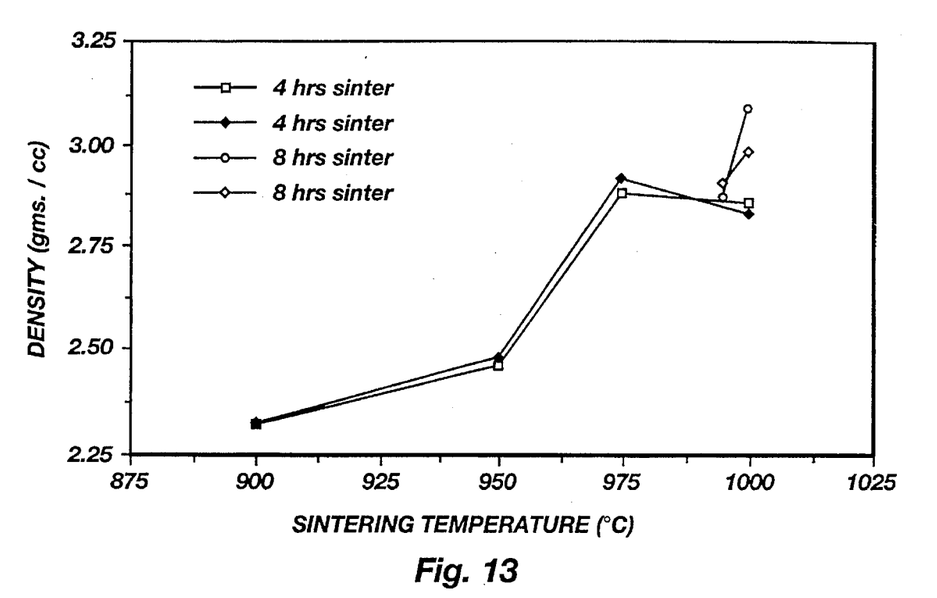
FIG. 13 is a graph illustrating sintering optimization of $Na_5NdSi_4O_{12}$.
Figure 14:
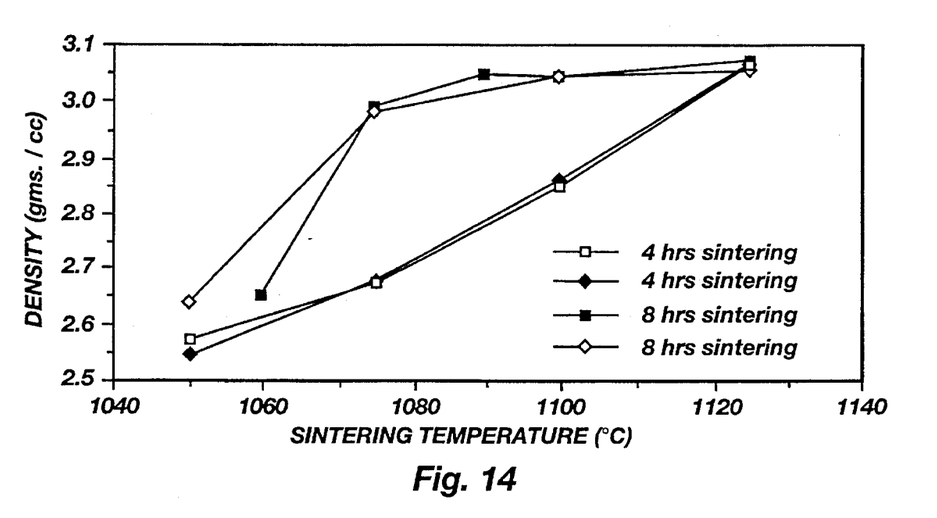
FIG. 14 is a graph illustrating sintering optimization of $Na_5DySi_4O_{12}$.

3) The effects of sintering temperature and hold time on density (inversely related to porosity) were determined to find conditions which achieved low porosity. Only materials which were at least 95% of theoretical density were considered for further testing. FIGS. 13 and 14 show the results of this kind of experimentation. As sintering temperatures and holding times increase, the opportunity to separate out a second phase increases. FIG. 12a shows how, at a lower temperature, a single phase is in equilibrium while at a higher temperatures below the melting range, two phases are in equilibrium at the same composition. While it is desirable to increase the density, it is undesirable to separate out a second phase as shown in FIG. 12b. It is preferable to increase the sintering temperature and time to increase the density but still maintain a single phase microstructure as shown in FIG. 12c. 4) X-ray diffraction spectrometry was used to verify that the materials remained in a single phase.

5) Finally, the materials were tested as ionic conductors in electrochemical cells to verify which materials and processing techniques yielded the highest conductivity. Table 1, above, indicates the sintering temperatures found to give good results and the material conductivity measured.

The improvement in density which results from various sintering temperatures is demonstrated in FIGS. 13 and 14 for $Na_5NdSi_4O_{12}$ and $Na_5DySi_4O_{12}$, respectively.

Figure 15:
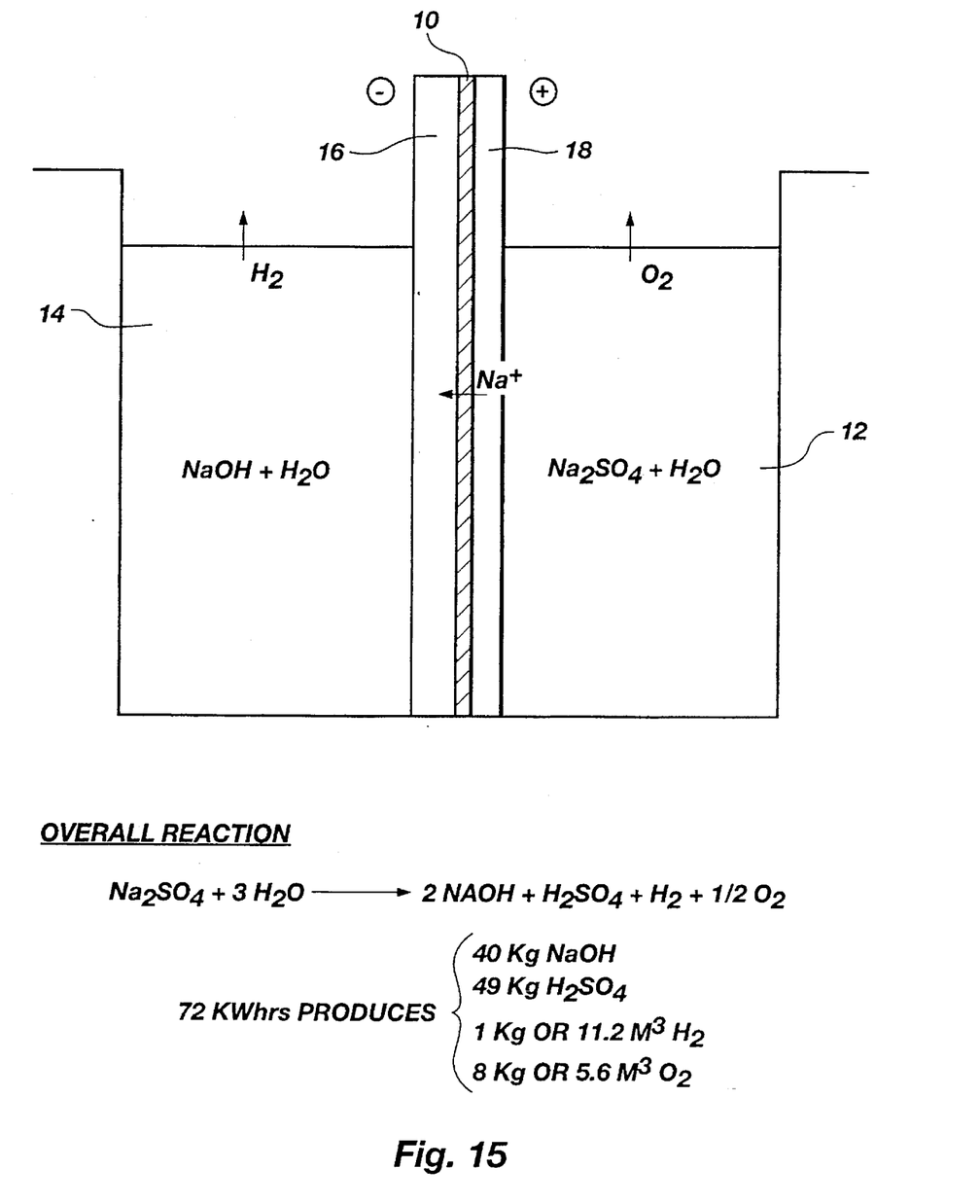
FIG. 15 is a schematic representation of an electrolytic cell with a flat plate electrolyte.

The ceramic materials of the present invention, having characteristics of high alkali metal ion-conductivity, high selectivity, low electron conductivity, good current efficiency and stability in water and corrosive media, are particularly suitable in electrolytic systems as an electrolytic membrane 10 which divides an anolyte chamber 12 from a catholyte chamber 14 in which are positioned, respectively, a cathode 16 and an anode 18, as shown in FIG. 15.

Figure 16:
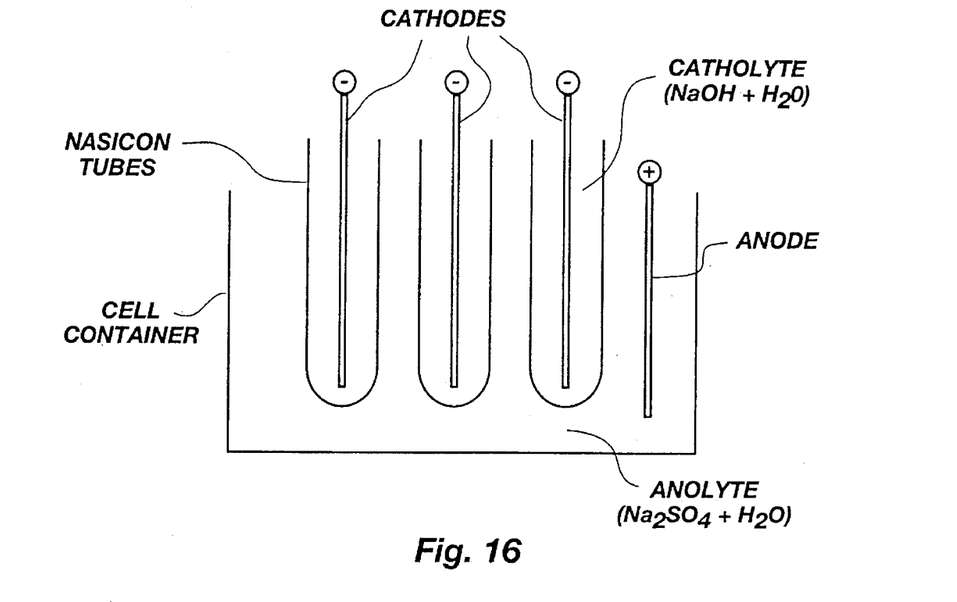
FIG. 16 is a schematic representation of a tubular electrolyte cell using mesicon-type material where the tube is closed at one end.

Membranes of mesicon-type material as described above may be formed by conventional ceramic processing techniques. Such membranes may be in the form of very thin sheets (tape cast) supported by underlying porous ceramic plates (e.g., porous Nasicon or alpha alumina), or by porous electrodes, or in the form of thicker sheets (plates) or tubes. A cell employing tubes of Nasicon-type material is illustrated in FIG. 16 wherein concentrated caustic is formed inside the tubes. The anolyte and catholyte chambers may be reversed.

Figure 17:
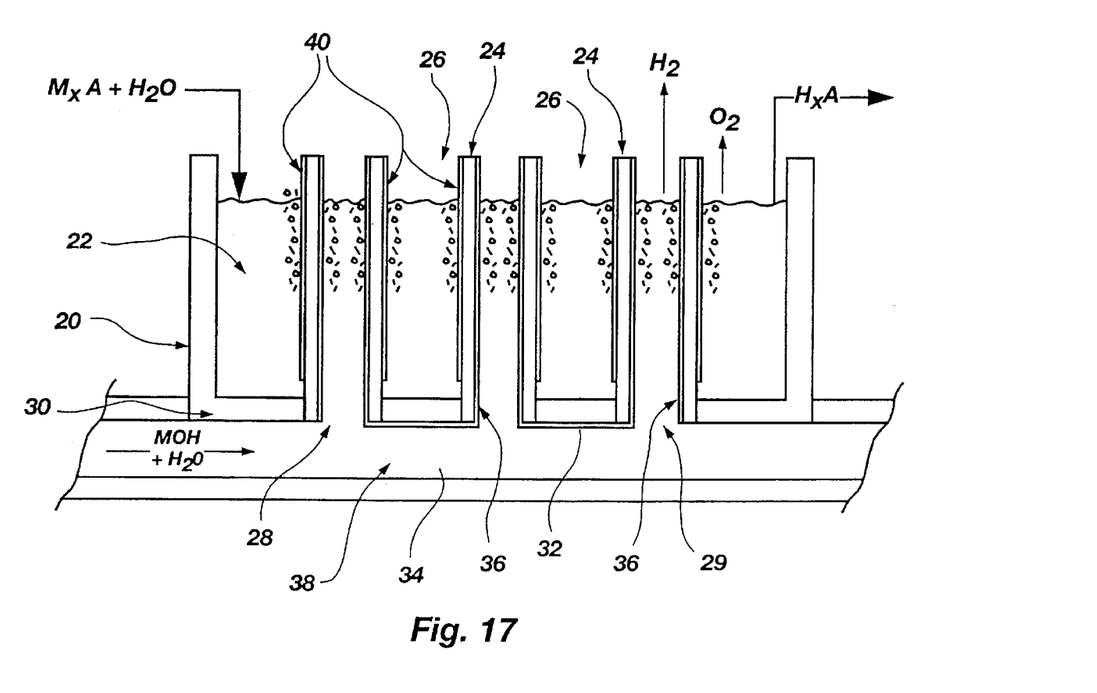
FIG. 17 is a schematic representation of a tubular electrolytic cell where the tube is open at both ends.

An alternative electrochemical cell structure is illustrated in FIG. 17, which shows how tubes of mesicon materials may be open at both ends and may be used for generating metal hydroxide, such as sodium hydroxide, from a metal salt, such as sodium sulfate, in a continuous manner. A cell container 20 holds the anolyte 22, which is an aqueous solution of the metal salt. Metal salt and water flow into the cell container in a continuous or semi-continuous manner as acid bearing anolyte is removed in a continuous or semi-continuous manner. Tubes 24 constructed of the metal ion conducting solid electrolyte are positioned such that the upper ends 26 are vented to atmosphere or to a hood while the bottom ends 28 of the tubes protrude through openings in the container floor 30. A seal 32 between the container floor 30 and the tubes 24 prevent anolyte from seeping out. The solid electrolyte tubes connect into a header pipe 34 or manifold or chamber below the cell container 20.

Metal hydroxide and water flow into the header 34 in a continuous or semi-continuous manner while metal hydroxide solution flows out with a concentration greater than the initial concentration. Hydrogen generation at the cathodes 36 located within the tubes causes a gas lifting pumping action which circulates catholyte 38 within the tubes with the solution in the header 34. Oxygen generated at the anodes 40 located outside of the tubes similarly causes circulation. A float valve or weir arrangement (not shown) is utilized such that the hydraulic level of the catholyte 38 is nearly the same as the anolyte 22.

In FIG. 17, the electrodes 36, 40 are shown to be adhered to and supported by the electrolyte tubes 24. However, they could be located off the tube surface and supported separately. Also the catholyte and anolyte positions could be reversed. For example, the catholyte could flow in the cell container while the anolyte could flow in the header.

From an energy efficiency standpoint, very thin ceramic membranes are preferred. These have the smallest ohmic resistance and energy loss. Thin sheets of Nasicon-type material, for example, may be formed by tape casting. Sheets as thin as about 25 micrometers to 0.5 mm are readily producible. Such thin sheets are preferably supported on or between porous structural supports. Such structural supports may be the electrodes or porous ceramic sheets or plates. The porosity of such ceramic supports is preferably quite high so that the liquid solutions on either side of the supports may be in intimate contact with a large area of the electrolytic membrane. Porosity, as a percent of total volume for electrolyte supports, ranges from about 30 to about 90% porosity.

Ceramic electrolytes of the type disclosed herein may be vapor deposited (sputtered or plasma sprayed) onto a porous substrate to form membranes which are very thin, e.g. about 5μ or even thinner. The porous substrate must have similar thermal expansion and good bonding with the membrane as well as good mechanical strength. If electrode materials are utilized as structural supports, then similar characteristics for these must be present.

The mesicon materials described herein have characteristics of high metal cation conductivity, high cation selectivity, and comparative stability in aqueous and corrosive media. The described characteristics render the disclosed mesicon materials suitable for use in many applications, including gas generation, and as a sodium sensor in a system such as is described in U.S. Pat. No. 5,120,422.

What is claimed is:

1. An alkali ion conductor ceramic material having structure providing high metal cation conductivity at temperatures below 200° C., high selectivity for said metal cations, current efficiency greater than 70% and stability in corrosive aqueous media, said alkali ion conductor ceramic material lacking phosphorus and having density greater than 95% to provide acid-resistance to said ceramic material.

2. The ceramic material of claim 1 wherein said alkali ion conductor ceramic material has the formulation $Na_5RESi_4O_{12}$, where RE is a rare earth metal or Yttrium.

3. The ceramic material of claim 2 wherein said alkali ion conductor ceramic material has the formula $Na_5NdSi_4O_{12}$.

4. The ceramic material of claim 2 wherein said alkali ion conductor ceramic material has the formula $Na_{(5-5\delta)}Nd_{(1+\delta)}Si_{(4-2\delta)}O_{(12-5\delta)}$, where $0 \leq \delta \leq 0.05$.

5. The ceramic material of claim 2 wherein said alkali ion conductor ceramic material has the formula $Na_5DySi_4O_{12}$.

6. The ceramic material of claim 2 wherein said alkali ion conductor ceramic material has the formula $Na_{(5-5\delta)}Dy_{(1+\delta)}Si_{(4-2\delta)}O_{(12-5\delta)}$, where $0 \leq \delta \leq 0.02$.

7. The ceramic material of claim 2 wherein said alkali ion conductor ceramic material has the formula $Na_{(5-5\delta)}Sm_{(1+\delta)}Si_{(4-2\delta)}O_{(12-5\delta)}$, where $0 \leq \delta \leq 0.02$.

8. The metal super ion conductor material of claim 1 wherein said material has the formula $Me_5ReSi_4O_{12}$, where Me is a metal selected from the group consisting of sodium, potassium, lithium and silver, and RE is Yttrium or a rare earth metal.

9. A solid electrolyte for use in an electrochemical cell used for electrolysis of aqueous alkali metal salt solutions to form caustic, said solid electrolyte being a phosphorus-free ceramic material which is a metal cation conductor, said metal cation conductor having structure which provides high metal cation conductivity at temperatures below 200° C., high selectivity for said cations, current efficiency greater than 70% and stability in corrosive aqueous media, and having density greater than 95% to provide increased acid-resistance.

10. The electrolyte of claim 9 wherein said metal cation conductor is a sodium super ion conductor.

11. The electrolyte of claim 10 wherein said sodium super ion conductor has the formulation $Na_5RESi_4O_{12}$, where RE is a rare earth metal or Yttrium.

12. The electrolyte of claim 9 wherein said ceramic material is a metal super ion conducting material having the formula $Me_5ReSi_4O_{12}$, and where Me is a metal selected from the group consisting of sodium, potassium, lithium and silver, and RE is Yttrium or a rare earth metal.

13. The electrolyte of claim 9 wherein said electrolyte further includes a protective layer of glass which is ion conductive.

14. An electrochemical cell containing an aqueous catholyte media, an acidic anolyte media and a solid electrolyte comprising a super cation conductor of the formula $Me_5ReSi_4O_{12}$, wherein Me is a metal selected from the group consisting of sodium, potassium, lithium and silver, and RE is Yttrium or a rare earth metal, and said super cation conductor having selected density to provide acid resistance, having stability in corrosive aqueous environments, high metal ion conductivity at temperatures below 200° C. and current efficiency greater than 70%.

15. The electrochemical cell of claim 14 wherein said solid electrolyte further includes an outer protective layer of ion-conductive glass.

16. A ceramic material having the formula $Na_5NdSi_4O_{12}$, said ceramic material having high sodium ion conductivity and high selectivity of sodium ions, and being stable in corrosive aqueous media.

17. A ceramic material having the formula $Na_5DySi_4O_{12}$, said ceramic material having high sodium ion conductivity and high selectivity of sodium ions, and being stable in corrosive aqueous media.

18. A solid electrolyte for use in an electrochemical cell, said electrolyte comprising a substrate of phosphorous-free metal super ion conducting material which has high conductivity for metal cations and high selectivity for said metal cations, and which is comparatively stable in corrosive aqueous media, said electrolyte further including a glass coating on said substrate of metal super ion conducting material in a thickness which permits cation conductivity through said substrate.

19. A metal super ion conductor ceramic material having structure providing high metal cation conductivity at temperatures below 200° C., high selectivity for said metal cations and current efficiency greater than 70%, said metal super ion conductor ceramic material having the formula $Na_5RESi_4O_{12}$, where RE is a rare earth metal or Yttrium, and having density greater than 95% to provide acid-resistance to said ceramic material and stability in water and corrosive media.

20. A solid electrolyte for use in an electrochemical cell used for electrolysis of aqueous alkali metal salt solutions to form caustic, said solid electrolyte being a metal cation conductor of ceramic material having the formula $Na_5RESi_4O_{12}$, where RE is a rare earth metal or Yttrium, said metal cation conductor having structure which provides high metal cation conductivity at temperatures below 200° C., high selectivity for said cations, current efficiency greater than 70%, and which has a density greater than 95% to provide increased acid-resistance and stability in water and corrosive media.

21. A solid electrolyte for use in an electrochemical cell used for electrolysis of aqueous alkali metal salt solutions to form caustic, said solid electrolyte comprising a phosphorus-free ceramic material being a metal cation conductor, said metal cation conductor having structure which provides high metal cation conductivity at low temperatures, high selectivity for said cations, good current efficiency and stability in corrosive aqueous media, and having selectively increased density to provide increased acid-resistance, and said solid electrolyte further including a protective layer of glass which is ion conductive.

22. An electrochemical cell containing an aqueous catholyte media, an acidic anolyte media and a solid electrolyte comprising a super cation conductor of the formula $Me_5ReSi_4O_{12}$, wherein Me is a metal selected from the group consisting of sodium, potassium, lithium and silver, and RE is Yttrium or a rare earth metal, and said super cation conductor having selected density to provide acid resistance and having stability in corrosive aqueous environments, said solid electrolyte further including an outer protective layer of ion-conductive glass.

* * * * *